Oct. 2, 1962  J. G. SLAVEN  3,056,612
COUPLING GEAR

Filed March 24, 1961  2 Sheets-Sheet 1

Oct. 2, 1962  J. G. SLAVEN  3,056,612
COUPLING GEAR
Filed March 24, 1961  2 Sheets-Sheet 2
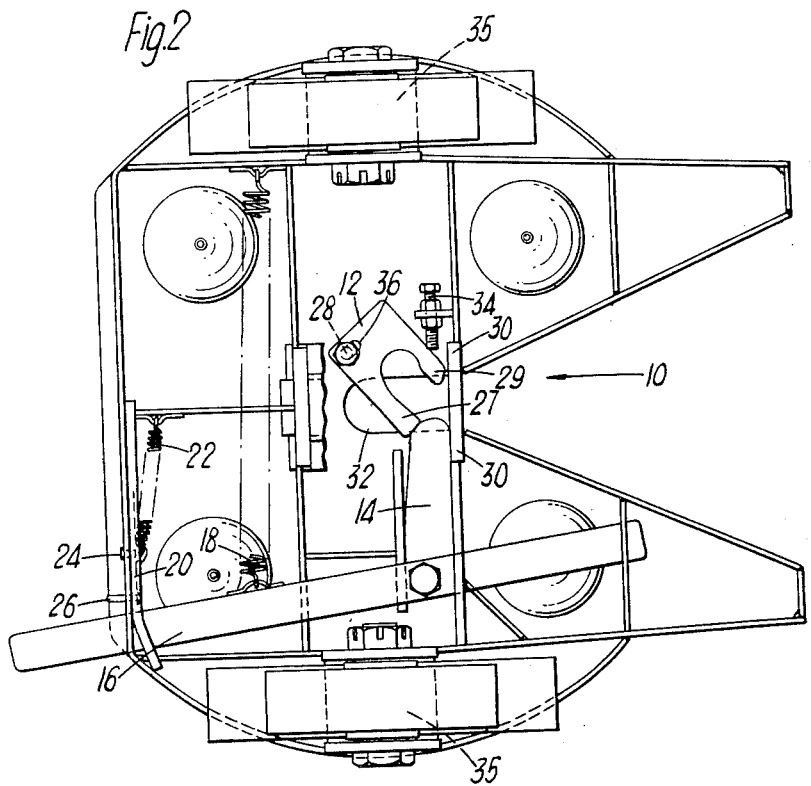
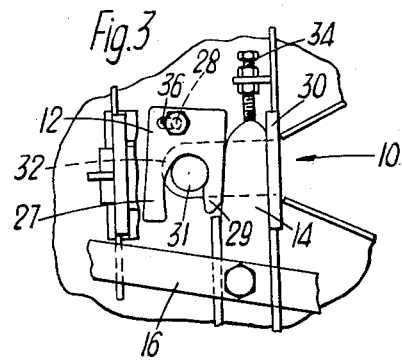

United States Patent Office 3,056,612
Patented Oct. 2, 1962

3,056,612
COUPLING GEAR
John Greenwood Slaven, Corby, England, assignor to York Trailer Company Limited, Corby, England
Filed Mar. 24, 1961, Ser. No. 98,059
Claims priority, application Great Britain Oct. 14, 1960
3 Claims. (Cl. 280—434)

This invention relates to a device (commonly called a "fifth-wheel coupler") for coupling a tractor vehicle to a trailer or semi-trailer.

It is desirable that such couplers have a simple construction and a positive locking action requiring no manual assistance during coupling.

A coupler in accordance with the invention has a coupling member in the form of a hook which is brought into the coupled position in which it embraces the king-pin of the trailer, as a result of the king-pin being passed through the entry slot of the coupling. The hook is held in the coupled position by a locking wedge member which is also brought into operation by the movement of the king-pin so that the coupling is completed without any attention by the operator except the insertion of the king-pin into the coupler. Further, the hook is preferably mounted for pivotal movement about an axis lying on the side of the longitudinal axis of the entry slot of the coupler which is remote from the side from which the locking wedge is brought into the locking position and is mounted on its pivot pin with sufficient clearance to enable it to adjust itself to compensate for wear and allow the locking wedge to do likewise.

An example of a fifth-wheel coupler in accordance with the invention is shown in the accompanying drawings in which:

FIGURE 2 is an underplan of the coupler in the open position, with certain parts removed; and FIGURE 3 is a sketch view of the coupling member of FIGURE 2 showing it in the coupled position embracing a king-pin of a trailer.

Figure 1:
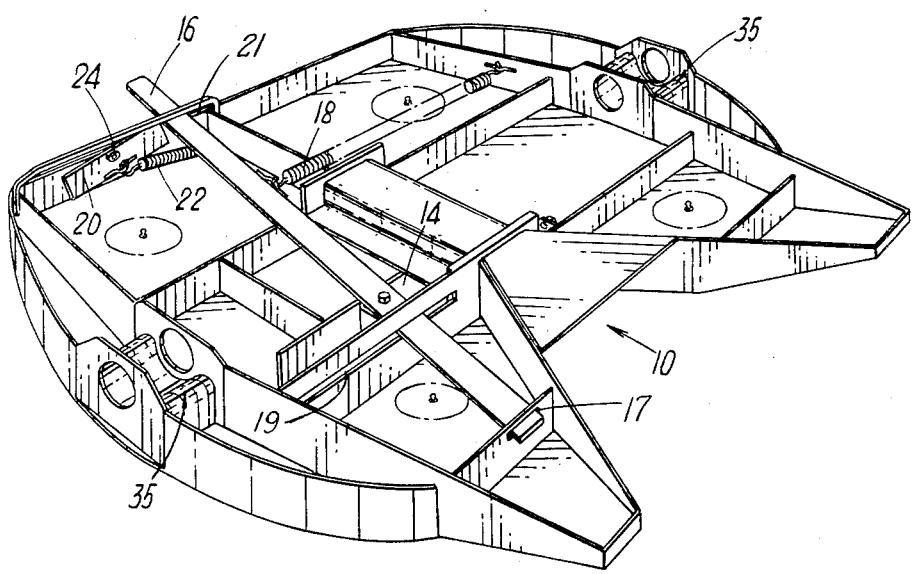
FIGURE 1 is a perspective view of the underside of the coupler.

The coupling comprises essentially a body plate having an entrance slot 10 on one side of the inner end of which slot a hook member 12 is pivotally mounted, a locking wedge 14 and operating lever 16 connected to the wedge being provided on the other side of the slot. The lever 16 is guided for movement in three horizontal slots 17, 19, 21 provided in walls upstanding from the base of the coupler body plate.

In FIGURE 1, the operating lever 16 is shown in the coupled position in which it is held by a spring 18 and is latched by a latch 20 held in the position shown by a spring 22. To bring the operating lever initially into the uncoupled position, the latch 20 is turned on its pivot 24 against the action of the spring 22 by means of a pin 26 (FIGURE 2) passing through a slot in the flange of the coupler body plate and secured at its inner end to the latch. The lever 16 can be brought past the latch to the left as seen in FIGURES 1 and 2, and be held against the action of its spring 18 by the outer end of the latch 20, the latch being itself held by the lever against anti-clockwise movement as seen in FIGURE 1 under the influence of its spring 22.

With the parts in the uncoupled position, the semi-trailer can be coupled simply by backing it so that its king-pin passes through the slot 10. In so doing, the pin encounters the tip of the wedge 14 and moves the latter so that the operating lever 16 is also slightly moved. This movement disengages the lever and the latch 20 to release the latch for movement under the action of its spring 22 so that it resumes the position shown in FIGURE 1. The operating lever 16 is thus brought under the influence of its spring 18.

As the pin moves further in it engages the arm 27 of the hook member 12 causing the hook to turn about its pivot 28 into the coupled position shown in FIGURE 3 while the spring 18 brings the operating lever 16 and the wedge 14 into their coupled positions in which the wedge lies between the arm 29 of the hook and a pair of stops 30 bounding the entrance slot 10. The tip of the wedge member and the arms 27 and 29 are appropriately shaped so that the wedge slides across into locking position without catching on the hook member.

In the coupled position (FIGURE 3) the king-pin 31 lies with its shank in the hook and with its head, which is of larger diameter than the shank abutting against a seating 32 on the coupler. The hook is held in the locking or coupled position by the wedge 14 which is in wedging contact with the hook and the stops 30. In order that wedging contact may be maintained in spite of wear of the parts, an adjustable stop 34 is provided for the wedge and the hook is provided with a slot 36 for engagement with its pivot pin 28. For example, if wear has occurred the stop 34 is adjusted outwardly to allow the wedge to extend further across the plate, the hook then adjusting itself to the new locking position by movement of the pin 28 in its slot 36.

To uncouple the trailer, all that is required is to bring the operating lever into the uncoupled position. Thereby, the wedge is removed from the locking position whereupon movement of the king-pin towards and out of the entrance slot causes the hook to be swung on its pivot into the uncoupled position. The pin, in so moving, slightly moves the wedge and releases the latch 20 so that the spring 18 forces the tip of the wedge against the end of arm 27 of the hook to hold it in the open position. On re-entry of a king-pin the arm 27 will be moved and the wedge member freed to assume its locking position.

The fifth wheel coupling shown in provided with trunnions or brackets generally shown at 35 for attachment to a tractor vehicle.

It will be appreciated that coupling can be effected without any manual operation of the parts; in other words, it can be effected by the tractor driver without assistance and without his having to leave his cab.

I claim:

1. A fifth wheel coupler unit comprising a coupler plate having an entrance slot, a hook coupling member having an inner and outer arm mounted for rotation on a pivot on one side of the inner end of the entrance slot to receive a king pin on a vehicle to be coupled, said hook member having limited movement in a plane parallel to that of said coupler plate about said pivot, a wedge shaped locking member having a rounded nose slidably mounted on the other side of the entrance slot and movable from a position in which the slot is substantially unblocked to a position extending fully across said slot and engaging one arm of said hook member to prevent said hook member from rotation, and a latch for said locking member said latch having a detent member biased to an open position, and an operating lever pivotally connected near one end to one end of the locking member and being guided for movement in the plane of the coupler plate, and biasing means to bias said lever to a position in which the said locking member extends fully across the entrance slot, the outer end of said lever engaging the detent when the locking member is to be latched in a retracted position, the arrangement being such that said lever is held by the detent member so long as it is forced against said detent member by said biasing means, said detent member moving to release said lever when said lever is moved away from the detent member, the nose of the locking member being so shaped in cooperation with the end of said inner arm of the hook coupler member that when said hook member is in the open position after the king pin has left the coupler, said locking member is held in a retracted position until said hook member is moved by the entrance of a king pin through the entrance slot.

2. A fifth wheel coupler unit according to claim 1 having three stop members for said locking member one of said stop members being adjustable and located at the other side of said entrance slot from said locking member and positioned to engage the nose of said locking member when the locking member is in its locking position across the slot and the other two stop members being provided one on each side of the entrance slot to engage the side of said locking member when in the locking position.

3. A fifth wheel coupler unit according to claim 1, wherein said coupler plate is formed adjacent the latch with an upstanding flange having a slot through it, the outer end of said lever extending through said slot, whereby said lever can readily be moved by an operator, said detent member having an operating member also extending through said flange for movement by an operator.

References Cited in the file of this patent

UNITED STATES PATENTS

| | | |
|---|---|---|
| 2,431,779 | Stevens | Dec. 2, 1947 |
| 2,833,560 | Cochrane | May 6, 1958 |
| 2,838,326 | Georgi | June 10, 1958 |
| 2,861,818 | Kayler et al. | Nov. 25, 1958 |
| 2,885,222 | Walther et al. | May 5, 1959 |